Inventor:
Edward Schubert

Patented Oct. 8, 1935

2,016,840

UNITED STATES PATENT OFFICE 2,016,840

FLUSH VALVE GUIDE

Edward Schubert, Chicago, Ill.

Application November 21, 1934, Serial No. 754,164

8 Claims. (Cl. 4—57)

This invention relates to improvements in flush valve guides and more especially such a device for guiding the stem of a valve as used in a flush tank for a toilet.

Among the features of my invention is the provision of such a device that is strong, durable, and simple in construction and operation. My improved device can be easily and quickly installed or removed.

Another feature of my invention is the provision of a plurality of guide holes or bearings for the valve stem with means permitting easy and quick substitution of a new bearing for a worn one. The construction also permits a wide range of adjustment for any bearing thus facilitating its proper adjustment and location in alignment with the center of the discharge outlet of the flush tank to insure smooth and proper operation of the valve.

Other features and advantages of my invention will appear more fully as I proceed with my specification.

Figure 1:
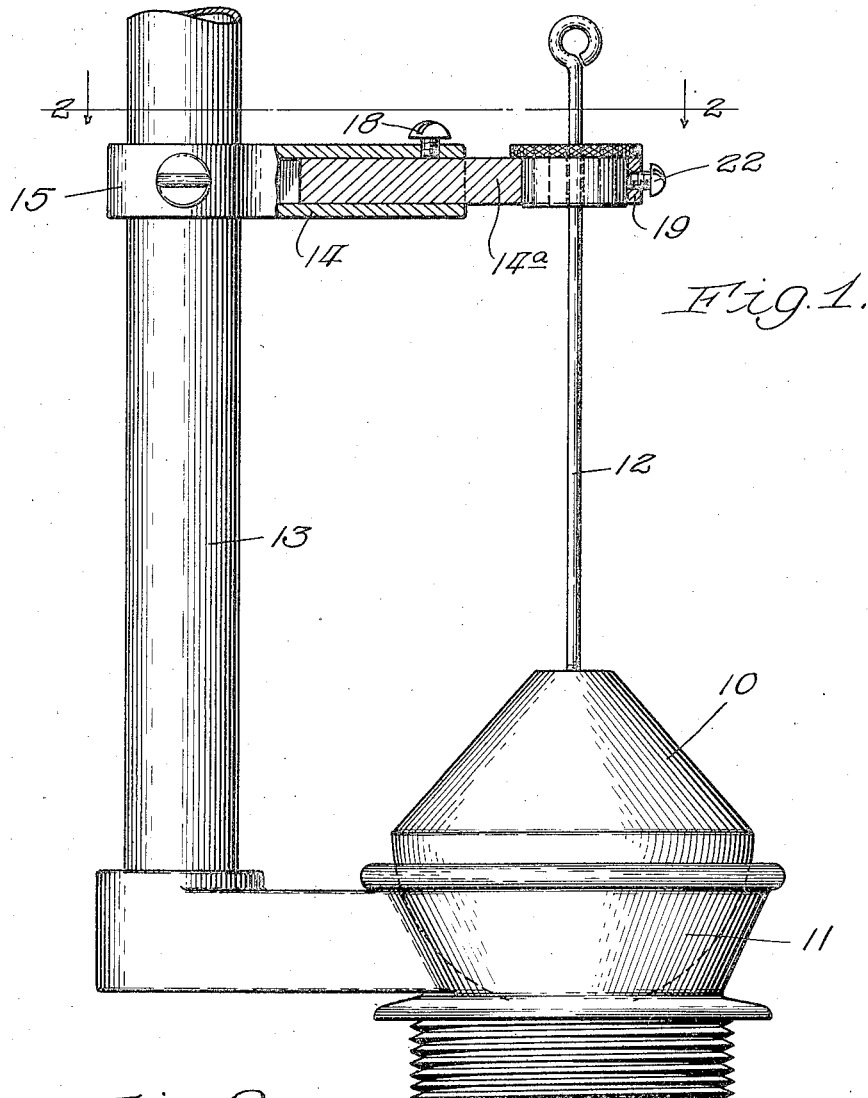
Figure 2:
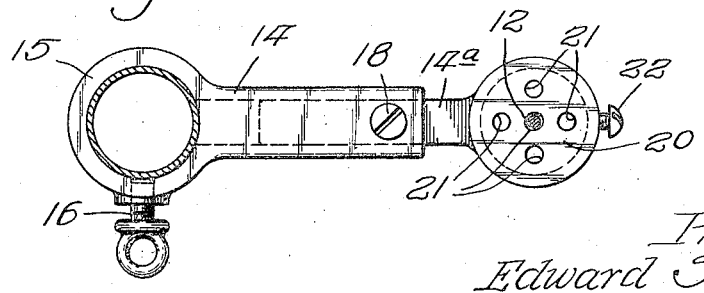

In that form of device embodying the features of my invention shown in the accompanying drawing, Fig. 1 is a view partly in side elevation and partly in section, and Fig. 2 is a view taken as indicated by the line 2 of Fig. 1.

As shown in the drawing, 10 indicates a conventional valve as used in a well known type of flush tank for closing the discharge outlet 11. 12 indicates the valve stem, and 13 the usual overflow pipe. All of these elements are of well known construction.

It is usual to provide a guide or bearing for the valve stem, such guide being carried on the end of an arm supported from the overflow pipe. With continuous use, however, such a guide will become worn and loose with the result that the valve stem is not correctly supported. This leads to improper seating or operation of the valve. In my improved device I provide a plurality of guide holes or bearings with means for readily substituting a new one for an old one, and correctly locating the same.

My improved device includes a supporting arm 14 with a collar 15 adapted to fit the overflow pipe 13. A set screw 16 is provided for holding the collar in proper adjustment. The arm in general includes an extension 14ª telescoped in the main part 14 and secured by the set screw 18.

The outer end of the arm is provided with a horizontal collar 19 carrying a guide member or disc 20 provided with a plurality (here shown as five) of vertical guide holes or bearings 21, 21. The guide member 20 is rotatably mounted in the collar 19 and adapted to be secured in any adjusted position by the set screw 22.

By rotation of the disc 20 in the collar 19, by inward or outward adjustment of the extension 14ª of the arm 14, or by horizontal swinging or rotatable adjustment of the arm 14 on the pipe 13, or by a combination of two or more of these adjustments, any of the bearings 21 may be quickly and properly located over the center of the discharge outlet 11 to serve as a guide for the valve stem 12. When one becomes worn, another may be quickly and easily substituted.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

The extension 14ª permits horizontal adjustment of the guide member toward and away from the overflow pipe 13.

What I regard as new, and desire to secure by Letters Patent, is:

1. In a device of the character described; a supporting arm; means for mounting said arm on the overflow pipe of a flush tank; and a guide member adjustably secured to the outer end of the arm, said guide member being provided with a plurality of vertical unalined guide holes therethrough.

2. A device as claimed in claim 1, in which the arm is provided with an adjustable extension, the guide member being secured to the outer end of said extension.

3. A device as claimed in claim 1, in which the means for mounting the arm on the overflow pipe permits rotatable adjustment of said arm on said pipe.

4. A device as claimed in claim 1, in which the means for mounting the arm on the overflow pipe permits rotatable adjustment of said arm on said pipe and in which the arm is provided with an adjustable extension, the guide member being secured to the outer end of said extension.

5. In a device of the character described; a supporting arm; means for mounting said arm on the overflow pipe of a flush tank; and a guide member rotatably mounted on said arm for rotation in a horizontal plane, said guide member being provided with a plurality of vertical guide holes therethrough.

6. In a device of the character described; a supporting arm; means for mounting said arm on the overflow pipe of a flush tank; a guide member provided with a plurality of guide holes therethrough; and means for mounting said guide member on said arm, said mounting permitting horizontal and rotatable adjustment of the guide member in a horizontal plane.

7. In a device of the character described; a supporting arm; means for mounting said arm on the overflow pipe of a flush tank; a guide member provided with a plurality of guide holes therethrough; and means for mounting said guide member on said arm, said mounting permitting horizontal adjustment of said guide member toward and away from said overflow pipe and rotatable adjustment of said guide member on said arm in a horizontal plane.

8. A device as claimed in claim 5, in which the mounting of the guide member on the arm permits horizontal adjustment of said guide member toward and away from the overflow pipe.

EDWARD SCHUBERT.